(12) United States Patent
Green

(10) Patent No.: US 10,273,677 B2
(45) Date of Patent: Apr. 30, 2019

(54) SELF-SUPPORTING AND LOAD BEARING STRUCTURAL JOINT

(71) Applicant: James Green, Mill Creek, WA (US)

(72) Inventor: James Green, Mill Creek, WA (US)

(73) Assignee: James Green, Bluffton, SC (US)

( * ) Notice: Subject to any disclaimer, the term of this patent is extended or adjusted under 35 U.S.C. 154(b) by 0 days.

(21) Appl. No.: 14/855,213

(22) Filed: Sep. 15, 2015

(65) Prior Publication Data
US 2016/0002910 A1 Jan. 7, 2016

(51) Int. Cl.
*E04B 1/24* (2006.01)
*F16B 7/04* (2006.01)
*E04C 3/07* (2006.01)
*F16B 7/18* (2006.01)

(52) U.S. Cl.
CPC .............. *E04B 1/2403* (2013.01); *E04C 3/07* (2013.01); *F16B 7/042* (2013.01); *F16B 7/0446* (2013.01); *F16B 7/182* (2013.01); *E04B 2001/2415* (2013.01); *E04B 2001/2457* (2013.01)

(58) Field of Classification Search
USPC .......................................... 52/848, 849, 854
See application file for complete search history.

(56) References Cited

U.S. PATENT DOCUMENTS

| | | | | |
|---|---|---|---|---|
| 1,736,878 A | * | 11/1929 | Duvall | F16B 12/58 5/299 |
| 3,738,083 A | * | 6/1973 | Shimano | E04B 1/24 52/271 |
| 3,820,299 A | * | 6/1974 | Verholt | A47B 96/1466 312/330.1 |
| 3,922,101 A | * | 11/1975 | Salmon, Jr. | F16B 7/0413 403/292 |
| 3,938,297 A | * | 2/1976 | Sato | E04B 1/2403 403/188 |
| 4,545,171 A | | 10/1985 | Colvin | |
| 4,557,091 A | * | 12/1985 | Auer | E04B 2/72 52/282.2 |
| 4,777,774 A | * | 10/1988 | Smalley, III | E04B 2/72 52/282.3 |
| 5,596,844 A | | 1/1997 | Kalinowski | |
| 5,720,134 A | * | 2/1998 | Kurtz | E04H 12/2292 256/65.14 |
| 5,950,373 A | | 9/1999 | Von Hoff | |

(Continued)

FOREIGN PATENT DOCUMENTS

JP 2012112169 A 6/2012

*Primary Examiner* — Patrick J Maestri

(57) ABSTRACT

In some embodiments, the structural joint includes a first structural member having a first mating face at one end of the first structural member, the first mating face having a two dimensional profile, a second structural member having a second mating face at one end of the second structural member and positioned proximate to the first mating face of the first structural member, the second mating face having a two dimensional profile that is similar to the two dimensional profile of the first mating face, a splice plate secured to the first structural member at the first mating face and removably secured to the second structural member at the second mating face, and fasteners that secure the splice plate to the first structural member and removably attach the splice plate to the second structural member.

12 Claims, 14 Drawing Sheets

(56) References Cited

U.S. PATENT DOCUMENTS

| | | | | |
|---|---|---|---|---|
| 6,138,427 | A * | 10/2000 | Houghton | E04B 1/2403 52/236.3 |
| 6,751,922 | B1 * | 6/2004 | Auriemma | E04B 9/068 52/506.05 |
| 7,637,076 | B2 * | 12/2009 | Vaughn | E02D 27/34 403/169 |
| 7,793,981 | B2 * | 9/2010 | Xie | B62D 21/02 280/785 |
| 8,418,425 | B1 * | 4/2013 | Santini | E04H 3/28 52/653.1 |
| 9,072,215 | B2 * | 7/2015 | Palen | A01B 76/00 |
| 2005/0111912 | A1 * | 5/2005 | Brain | A47B 57/50 403/353 |
| 2005/0284081 | A1 * | 12/2005 | Porter | E04B 1/24 52/650.1 |
| 2006/0157380 | A1 * | 7/2006 | Lowry | B65D 21/0215 206/594 |
| 2006/0185311 | A1 * | 8/2006 | Attalla | E04B 7/045 52/639 |
| 2008/0178551 | A1 * | 7/2008 | Porter | E04B 1/24 52/653.1 |
| 2009/0159312 | A1 * | 6/2009 | Jordan | H02G 3/0608 174/135 |
| 2010/0018131 | A1 * | 1/2010 | Green | E04B 1/24 52/79.5 |
| 2012/0090140 | A1 * | 4/2012 | Montemayor | E04H 17/143 24/593.1 |
| 2014/0083042 | A1 * | 3/2014 | Hiragaki | F16B 7/182 52/655.1 |

* cited by examiner

EXPLODED VIEW

Section A-A

SELF-SUPPORTING AND LOAD BEARING STRUCTURAL JOINT

CROSS-REFERENCES TO RELATED APPLICATIONS

This application claims priority to U.S. Provisional Application No. 61/789,603, filed on Mar. 15, 2013 entitled RELEASABLE, SELF-SUPPORTING/LOCATING LOAD BEARING STRUCTURAL JOINT, which is hereby incorporated by reference in its entirety.

BACKGROUND

To simplify the description, structural framework may be categorized as being fixed, semi-fixed, or temporary. The building type will determine the building codes and regulations to be met by the structure. Examples of fixed structural framing are those used for permanent buildings, this is where the building is intended to remain at the location of construction and is not designed to be moved. The joints may be bolted, riveted, welded or a combination thereof, the attachment method being determined by such factors as the design/approval requirements, accessibility and availability of equipment and skilled labor. Examples of semi-fixed structures include buildings used for temporary housing such as camps for the military and mining community where the buildings may need to be disassembled and moved for the camps to be relocated as and when required. The building may be connected as a permanent structure but have the ability to be disassembled. For this category the building joints should also consider being sized for transportation and capability of assembly, locking, disassembly and dependent on how often the structure is moved, wear and tear. Examples of temporary structure include scaffolding where the structure is designed to be easily assembled and disassembled using standardized components, fasteners and assembly equipment. The building codes will differ from those used for fixed and semi-fixed buildings. Additionally, the building structural components are designed with a weight and size that can be easily transported and handled at the construction site.

Currently, sustainability and "green building" is a leading driver of architectural design. Prefabrication introduces the ability to make things quicker, easier to assemble, and improve quality. Using engineered components with tight tolerance controls provisions the ability to make a tight structure with minimal gaps. The result of producing parts in a factory environment creates cost effective production of components that repeatedly fit together. With the use of analytical tools covering multiple design cases, the parts will be designed to meet the loading requirements, thereby redundant reducing material. The reduction in material waste along with the reduced manufacturing and transportation costs go a long way towards making the product and building structure more environmentally friendly and affordable.

The building industry, as with other industries, is taking advantage of "modular" type construction, where assemblies, sub-assemblies and components arrive at the construction site prefabricated. Time and cost reductions are made by delivering finished components to the construction site that may only require assembly, as opposed to fabricating or reworking components to fit on the construction site where access, day light and weather can affect both the construction quality and assembly times. The design is based around the utilization of advancements in design and manufacturing technology, which will now be discussed in further detail.

The construction industry, as with other industries, benefits from developments in new technology, manufacturing methods, materials and fasteners/fastening techniques. With developments in new technology come the ability to manufacture components/structures that were either not possible before due to manufacturing constraints or could not cost effectively be produced. An example of developments in new technology supporting manufacturing methods can be seen with the introduction of 3D (three dimensional) definition of parts where the drawing definition can be represented by an electronic definition of the part in '3D' such as Initial Graphics Exchange Specification (IGES) or STandard for the Exchange of Product (STEP defined by ISO-I0303-21) model data file. These files contain vendor neutral data that allows digital exchange between different programs used for design, analysis and manufacture.

Programs such as SolidWorks and CA TIA to name two commercially available products are examples of industry standard software used for design and simulation. Describing CATIA (Computer Aided Three-dimensional Interactive Application) in more detail to provide an overview of the product; CATIA is a multi-platform CAD/CAM/CAE commercial software suite developed by the French company Dassault Systemes. Commonly referred to as a 3D Product Lifecycle Management software suite. CATIA supports multiple stages of product development (CAx), including conceptualization, design (CAD), manufacturing (CAM), and engineering (CAE). CATIA facilitates collaborative engineering across disciplines, including surfacing & shape design, mechanical engineering, and equipment and systems engineering. It also provides tools to complete product definition, including functional tolerances as well as kinematics definition and structural analysis.

Catia V5 is currently common place in the Automotive and Aerospace industries. 3D definition files may be used to fully define parts, subassemblies and assemblies, where along with the geometric definition of a component the material, production process, inspection and tolerance requirements can be defined in the notes of the electronic part or product file. Once the part is defined it can be used to define assemblies where multiple parts may be brought together to form a product. The same definition of the part may be saved in different forms so they can be used with different programs. Two of the forms commonly used by manufacturing equipment are IGES and STEP files described earlier.

Examples of developments in the manufacturing industry are supported by automated machinery. There are also cost, quality and production time benefits associated with the use of automated machinery for manufacture examples of such are water jet, laser cutting and robot welding machines, subsequent to setting the machine up, the machines may only require intermediate checks due to the self-monitoring ability of the machine. Quality control may be reduced to probability sampling of the components produced and checking the quality of the materials used for manufacture. Additionally, if the manufacturing/machining process is cost effective, additional holes or features can be added into the parts allowing the part to be used in multiple configurations. Reducing the number of part types, faster types and using standard sections all support a cost effective efficient manufacturing process. The use of robotics is common in the manufacturing industry, having manufactured accurate, close tolerance parts allows for accurate location of parts in tooling jigs and fixtures, provisioning for robotic welding where parts can be produced with repetitive quality.

By encompassing advancements in technology in building design enables improvements in environmentally friendly, sustainable "green buildings", this is supported with efficient manufacturing methods and efficient use of materials. Automated machinery can reduce waste levels with inherent accuracy and programs such as those used to determine the most efficient cutting of part combinations to yield the most parts out of standard length of raw material.

Developments in the use of building materials can be seen in the materials used for building cladding such as Panelized finishing of structures, where both residential and commercial buildings are clad using easily installed energy efficient insulated panels mounted on railing systems such as pre-formed sheet metal and interlocking extrusions. The panels can be modified on site avoiding the necessity for transporting different panel types which have to be protected and traced. On-site modifications may include the panel being trimmed to suit the installation requirements or having apertures cut on site provisioning for doors, windows and accessories such as solar panels. Additionally there are developments in new materials; metallic, composites and combinations of both, one example being Structural composites bonded panel assemblies.

For example, developments in fastening systems, captive nut installations such as "Riv-nuts" where the nut is formed into the component(s) to be attached or a nut carrier plate that can be attached to the component(s) being attached allowing one sided installation or fastening to closed section structural component such as tube. Thread forming such as 'flow drilling' where the thread is formed in the base part or a nut 'carrier plate', along with developments in locking such as ant vibration washers and fastener systems.

In the design and manufacture of the building components, advances in design and analysis tools allows the ability to simulate and analyze designs in three dimensions with static and fatigue loading, using force, pressure, inertia and temperature loading in singular or combination load application. Thermal analysis tools can be used to aid the material selections, providing the benefits required for the environment to which the building will be subjected. This is beneficial in the analysis of the structure exposed to the effects of extreme weather. Structural and thermal analysis also support the "green building" approach by selecting the most suitable materials, the waste can be minimized by designing the structure to meet the loading requirements, this being done by designing an 'efficient' structure where the cross section of the load bearing members is designed to match the loading requirements. This type of design approach is typical in the aerospace industry, where the airframe structure is designed to closely meet the loading requirements, this is typically being done by creating a 'Finite Element Model' (FEM) of the complete aircraft structure. Industry standard programs such as MSC Patran (pre and post processor) and MSC Nastran are typically used to perform linear and non-linear structural analysis.

SUMMARY

Figure 1A:
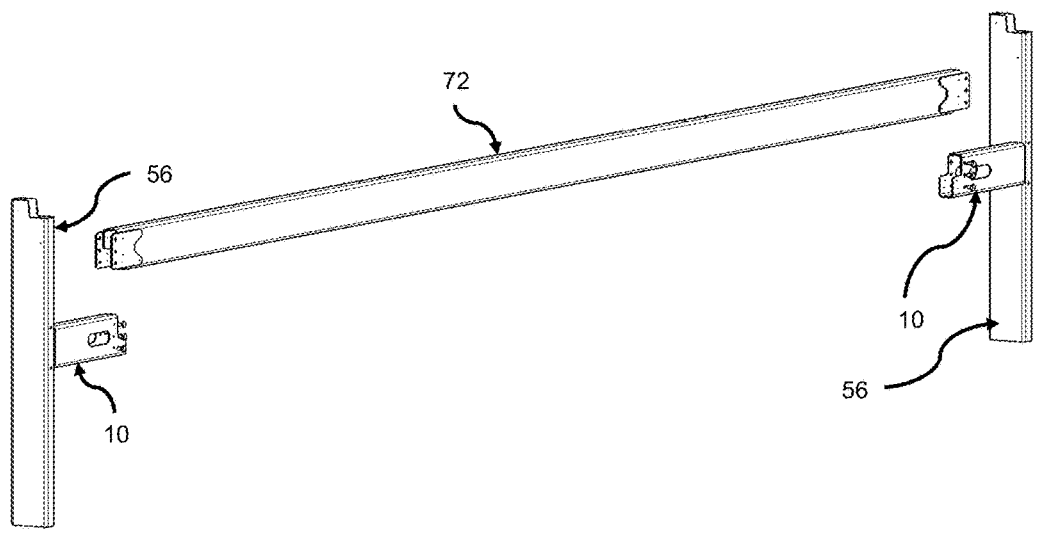
FIG. 1A and FIG. 1B show isometric views of a span beam prior to being lowered into an install position.

The present disclosure relates generally to building structures. More particularly, the present disclosure relates to a structural joint used to connect the structural members that provide load transfer and alignment for the connection between structural members, columns and beams.

In some embodiments, the structural joint includes a first structural member having a first mating face at one end of the first structural member, the first mating face having a two dimensional profile, a second structural member having a second mating face at one end of the second structural member and positioned proximate to the first mating face of the first structural member, the second mating face having a two dimensional profile that is similar to the two dimensional profile of the first mating face, a splice plate secured to the first structural member at the first mating face and removably secured to the second structural member at the second mating face, and fasteners that secure the splice plate to the first structural member and removably attach the splice plate to the second structural member. The second member may also have a removably attached nut carrier plate provisioning fastener retention.

For example, the two dimensional profile may include a protrusion at a top portion of the mating face and/or a protrusion at a bottom portion of the mating face, such that the two dimensional profile of the first mating face complements the two dimensional profile of the second mating face and/or a portion of the two dimensional profile of the second mating face rests on a portion of the first mating face of the first structural member when the second structural member is positioned proximate to the first structural member.

DETAILED DESCRIPTION

A releasable, self-supporting and/or self-locating load bearing structural joint and assembly are described. In some embodiments, the structural joint (e.g., for use in forming a span beam) may be formed by providing a first structural member having a first mating face at one end of the first structural member, the first mating face having a two dimensional profile, positioning a second structural member having a second mating face at one end of the second structural member proximate to the first mating face of the first structural member, the second mating face having a two dimensional profile that is similar to the two dimensional profile of the first mating face, the second structural member including a splice plate secured to the first structural member at the first mating face, and removably securing the first structural member to the second structural member at the second mating face by fastening the splice plate to the first structural member.

Further details regarding various embodiments of the structural joints and methods of forming the structural joints will now be described.

The present disclosure is directed to providing a joint suitable for use on a prefabricated structure by providing a releasable, self-supporting and self-aligning load bearing structural joint that may be used to connect the structural members being used to form a building load bearing structure. The design incorporates the DFMA (Design For Manufacture and Assembly) philosophy where the joint design provisions for both manufacture and assembly, capable of being mass produced at low cost and easily assembled.

The joint utilizes profile(s) whereby the effects of gravity can aid the members being located and held in place during assembly. The mating members are profiled to aid location of the adjoining parts in the vertical, horizontal and inclined positions directions. The splice plates are typically securely attached to one of the members being joined, the splice plates may be securely attached by means such as welding both on one member of the structural joint or one splice plate welded on each member. Due to the locations of the structural member, the installation may be installed from one side or normal to the splice plates, as a result the splice plates may have to be welded on both members (one on each structural member) as opposed to both splice plates being welded on one member.

Figure 3:
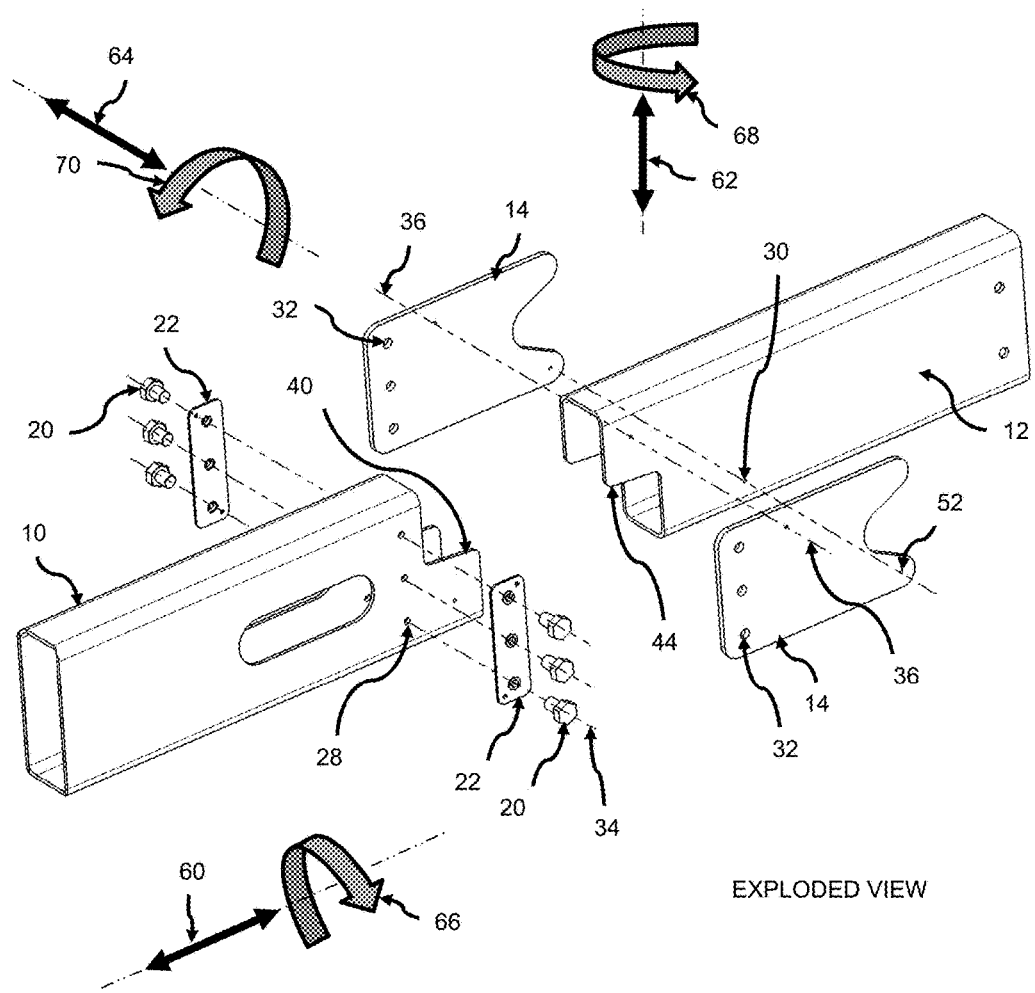
FIG. 3 is an isometric view showing an exploded view of a structural joint for mating structural members in a horizontal orientation.

The directions used for description relate to the orientation of the structural members such as shown in FIG. 3, axial (60), normal (62) and transverse (64) and respective rotations, (66), (68) and (70). The 'directions' will be identified in the respective FIGS for the orientation of the joints being described.

Conventionally there are six (6) degrees of freedom, three (3) in translation 'X', 'Y', 'Z' represented by (60), (62), (64) respectively and three (3) in rotation; 'RX', 'RY' 'RZ', represented by (66), (68), (70). To aid discussion, the degrees of freedom are defined in the FIGS for the joint being described.

The combination of the profiled members and the splice members in the horizontal position resist movement in all directions except vertical/normal (62) and rotational (70) as shown in FIG. 3, the attached splice plate (s) in the transverse (64) direction relative to the members, both the profile and the splice plates provide joints that restrict the movement of the structural members in the (down) normal (62), axial (60), transverse (64) and rotation (66) and (68), in the direction relative to the structural members while the retention/securing fasteners are being installed. Depending on the joint orientation both the profile and the splice plates provide joints that support the structural members in the normal (62), axial (60), transverse (64) direction relative to the effects of gravity while the retention/securing fasteners are being installed.

The profile of the joint members may be changed to accommodate the orientation of the structural member joint for a continuous beam/column. The structural member for example may be vertically lowered in position even if the beam is on a slope.

To support modular building construction the components would be sized with handling and transportation needs in mind. The handling weight may be restricted by the ability of the personnel, construction site codes and available machinery. The transportation requirements may be set by the maximum physical size of the components capable of being transported and/or packaging requirements along with any transport ministry weight restrictions.

Furthermore the maximum size of the component may be restricted by the materials, manufacturing and finishing processes adopted, for example tube is common in 20 ft lengths and machinery may be designed for this length although lengths such a 24 ft are also available. Pricing is also a consideration typically lower for the more common sizes. Additionally the finishing process for such finishing as powder coating may be restricted by the length of the oven or handling equipment and in Galvanizing, the size of the available tank.

The technology presented in this application has taken advantage of new methods of design and machining to develop a joint that is suited to the building and construction industry where a profile has been introduced in mating parts to support the joint while the securing fasteners are installed. For example, with reference to FIG. 1A the structural joint may enable a Span Beam (12) to be held in place by gravity while the fasteners are installed, use of only some of the fasteners need to be installed during assembly, fasteners may be installed finger tight and tightened later, a locking device or method employed if and as needed, and so on.

In one example, the structural joint uses tube section, the self-supporting joint design can be used to replace conventional fastened "through bolted" joints by installing separate fasteners through either side of the joint. The "through bolted" configuration is typically where a fastener is installed through a complete section, tube and splice plates and there would be no need for internal nuts. This type of design has inherent drawbacks where the fastener holes would need to be aligned through the complete joint assembly, in the example of the tubular structure presented in FIG. 3 two tube walls and two splice plates, this could drive a requirement for larger tolerances. Another drawback being the bolts act in a manner to "crush" the tube section if over tightened and a longer more expensive bolt needs to be used. Additionally the tubes may deform over time and the fasteners loosen.

The joint design can also be a replacement for welding where one of the mating structural members is threaded and in lieu of welding the members together. Although welding is still used in construction it has restrictions due to location and orientation of the joint where access may be limited, weather and additionally the weld may require inspection for approval. Welding may still be performed if a requirement, whereby the joint defined being used to locate and secure the mating parts prior and during the welding operation.

In the following detailed description, reference is made to the accompanying drawings, which form a part of the description. The embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

A detailed description of embodiments is provided below along with accompanying figures that illustrate the principles of the technology. The technology is described in connection with such embodiments, but the technology should not be limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of illustration and the technology may be practiced according to the claims without some or all of these specific details. For the purpose of clarity, technical material that is known in the technical fields related to the technology has not been described in detail so that the technology is not unnecessarily obscured.

Examples of the Structural Joint

The following description will refer, generally, to FIGS. 1A through 16. The 'Joint' is described more fully herein with reference to the accompanying FIGS., in which embodiments of the invention are shown. The Joints may, however, be embodied in many different forms as presented in FIG. 7. FIG. 3 and FIG. 7 present horizontal and vertical joints respectively, the same design principals can be applied to sloped members, for all joint configurations the mating profile is designed as being suited to the joint orientation. The other examples shown in FIGS. 10 through to 16 show additional configurations, however it should not be construed as limiting the invention described therein; rather, these embodiments are provided so that this disclosure will be thorough and complete and will fully convey the scope and intent of the invention to those skilled in the art. The members shown in the examples are typically straight for simplicity; these can be replaced with curved members which may improve strength and/or aesthetic qualities.

It should be kept in mind that the fastener configurations presented in FIGS. 1A through 16 are to aid the description of the joint, the number size and configuration of fasteners may be changed to suit the loading requirements, this may vary between no fasteners where the joint is held in place by gravity acting on the Beam/Member profile (44)—Stub Beam mating profile (40), splice plates (14) and one or more fasteners. The number of fasteners will be determined by the loading or other joint requirements. One or more holes can be used for alignment purposes; where there is an additional hole or a fastener will not be installed and a bar or screwdriver can be used to move the members into the aligned position, this can be done with the fastener holes but care needs to be taken as not to damage threads. Due to the 'nesting' nature of the profiles, only one fastener would be required to secure the beam in all six degrees of freedom, three translations and three rotations. The Splice plates (14) and where installed nut carrier plates (16), nut carrier assembly (22) can be modified to suit the number of fasteners. Furthermore the profile of the joint is presented for description and the profile can adapted to suit the loading or joint requirement.

The joint was initially designed for a steel tubular structure the intended design was to hold the members in position without the need for an additional supporting plate [See Green U.S. Pat. No. 8,186,110 B2—FIG. 5C Support Plate (105)], the support plate has been replaced by profiling the end of the tube to provide support. The joint has been developed to allow the easy installation by one person for the same and differently sized components with the same and different profiles.

The access/inspections hole(s) or slot(s) (42) are added to provide access to aid for example, installation and inspection in closed or open section joints, these holes or slots can also be utilized to route provisions or utilities, for example in a tubular section joint, electrical conduit can be run inside the tube section and exit for connection via the hole/slots, the holes/slots can be near or away from the joint(s). The holes or slots can be shaped to suit the profile required.

Developments in design software allowing for the definition of parts and assemblies in 3D works well with the use of machinery such as a laser cutting, water jet and conventional CNC machines where the profile can be easily, accurately and cost effectively incorporated into the design. Further, the electronic definition of the part can be transmitted in 3D definition in lieu of a 2D drawing where the part definition needs to be programmed. The 3D definition of the component, for example, can be defined in one of the current industry standards such as an *.IGES file or *.STEP/ *.STP file formats described earlier.

The original design intent was for a container house structure, as shown in U.S. Pat. No. 8,186,110, which is hereby incorporated by reference in its entirety, where the members are sized to be transported within a shipping container and therefore sized to fit within the confines of the container.

The basic profile is a rectangular shape with other embodiments incorporating different shapes to facilitate the orientation and location of the beam/joint.

The embodiments presented are typically for straight beams/structural members, where joints for horizontally and vertically orientated joints are defined for example purposes. The same design principals can be defined for sloped and curved beams.

The mating members once placed into position with the locating operation aided by the profile on the end of the tube, the profile provides a datum for the member/beam positioning so the fasteners can be installed more easily. Additional holes can be added common to the splice/mating beam to be fastened, to support the locating operation, in one embodiment a tapered pin can be used to align the holes, tapped into position using a hammer.

Figure 15:
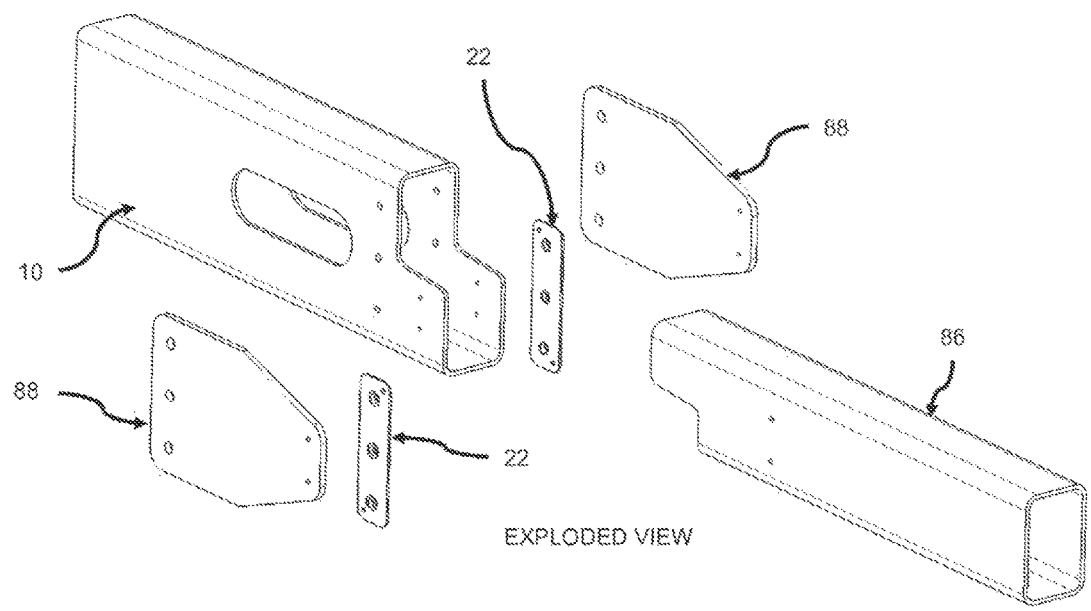
FIG. 15 is a view of different sized structural members being attached.

The design can accommodate tubes of different size and wall thicknesses, this is achieved by defining the mating profiles and fastener locations about a centerline, this may be on, above or below. For example, two tubes the same width and different heights having mating profiles as shown in FIG. 15, by defining the sections about the centerline ensure mating of the parts, this can also be used to overcome same size sections having a difference in manufacturing/forming dimensional tolerance in sections being joined. The same or different width tube can be joined with the same or different height tube, this can be accommodated by profiling the splice plate to accommodating the tube sizes, profile and fastener pattern required, which may be defined about the centerline to accommodate manufacturing tolerance where one tube may be higher than the other but the fastener locations are defined about the tube centering. For example, in conventional tube laser cutting machines the tube is located by the jaw positions there the centerline is the center of the jaw positions, as opposed to dimension the fasteners from one side which may vary with relation to the other side of the tube due to the tolerance of the tube. For example a reasonable tolerance for a 5 inch×5 inch tube can be +/−0.030" therefore one tube can be 0.030" (0.47") under one 0.030" (0.53") over with a net difference of 0.060."

Same or different size tube or solid section can be accommodated in a similar manner to the square, rectangular, triangular hexagonal amongst other geometric shapes with the same or different size/profile. The mating of different sections can be accommodated by changes in the splice profile. The same and different sections, profiles, heights can be accommodate by adapting the splice plate to suit. The same or differing sections can include square, circular, rectangular, trapezoidal, pentagon, hexagon and any other closed sections. Open sections can also be accommodated in a similar manner including but not limited to, 'T','C', 'R', '1', 'U','Z' and any other open profiled sections.

Laser cutting equipment provides an automated, low cost production option with high rate of repeatability capable of maintaining close tolerance and provided parts which do not necessitate de-burring, although may be beneficial to remove the heat affected zone depending on the application and loading. The laser cutting beam width is in the region of 0.010" can cut hole sizes as small as 0.010". Suppliers can offer accuracy +/−0.010" on laser cut parts with some of the descriptions on the internet claiming a machine tolerance as good as +/−0.004".

Defined parts can be accurately and quickly reproduced. For example cutting tube sections, the laser cutting machine typically locates the parts in a four jaw chuck, the jaws of the chuck locate the part on center horizontally 'Y' and vertically 'Z' on the centerline of the tube and after the first cut by the laser on the end of the tube to provide a clean datum surface in the axial 'X'—forward/aft direction. The Laser or water jet cutting machines are monitored by positioning sensors and are typically computer controlled.

The use of close tolerance automated machinery reduces the advantage of low cost labor as the labor time is a relatively low percentage of the overall component manufacturing time where good design principals are incorporated. The joint design takes advantage of the latest design and manufacturing techniques, where close tolerance components can be accurately mass produced, coming off the machine with little further rework.

In embodiments of the present technology, the structural member to be attached can be held in place by gravity due to the profile of the mating parts in conjunction with; the splice plate (14) or plates (14) and/or the securing fasteners (20). The joint may provision for more than one fastener, however to retain the joint member(s) safely during construction one fastener could effectively hold the structure together if not subject to overloading. Such attachment may enable the following:

The member can be held in position by the effects of gravity without fasteners (20) being installed as long as the supporting members were not subject to movement;

The supporting beam will provide the supporting surface to hold the beam in place, using at least one surface;

Mating parts can be pre drilled, cut and/or formed, with a location indexed from the profile to aid/control location;

Tolerance can be accommodated by clearance in fastener hole diameter. Holes provided undersize and opened by fastener during the installation process, this could be beneficial by cold working the hole. Splice plates can be provided either or both sides to prevent transverse (64) movement. In one embodiment the splice plates may be on one member, there may be situations due to access limitations where one splice plate would be securely attached on each of the two mating members, for example considering the configuration shown in FIG. 3, if in the horizontal orientation; allowing installation from normal (62) and transverse (64), or a combination of both. In some embodiments, the splice plates are joint load transfer members, the nut plates are used to hold the slice fasteners in place.

Mating parts can be angled at or between the vertical and horizontal to suit the requirement and profiled accordingly. An example of a Horizontal joint and a Vertical joint is presented in FIGS. 1A through 7 and a sloped joint in FIG. 7;

The joint can be made for a horizontal or sloped beam to intersect directly with a vertical or sloped beam by introducing a mating profile into the adjoining members. Where sloped is any angle between vertical and horizontal;

Adjoining beams can comprise of horizontal to horizontal, sloped to sloped vertical to vertical, sloped to vertical! horizontal or any combination of the aforementioned;

The use of a radius or curved profiles, reduces stress concentration details such as corners or sharp profile changes.

With reference to FIG. 3, embodiments for a structural joint where a nut carrier plate assembly (22) is used to attach the Support Beam (10) and splice plates (14) attached to the adjoining span member (12) to be connected, this can be reversed with the nut carrier plate assembly (22) being attached to the span member (12) and splice plates (14) being attached to the Support Beam (10) or any combination where one nut carrier plate assembly (22) and one splice plates (14) is reversed for example where one nut carrier plate assembly (22) and splice plates (14) is installed on any beam or beams. For example, the carrier plate is attached to the inside of the tube and holds the riv-nuts (nuts) in the correct location and the splice plate may be on the outside, the fasteners (bolts) passing through the splice plate (14) and beam (10) and screwing into the riv-nuts held by the carrier plate, thereby holding them in place. Therefore, the splice plates can be internal or external to the tube, and additionally the nut plates can be directly connected to the splice plate if the splice plates are internal to the tube or the internal face of the tube if the splice plates are external.

Nut carrier plates assemblies (22) have the ability to be removed and replaced if damaged.

Figure 4A:
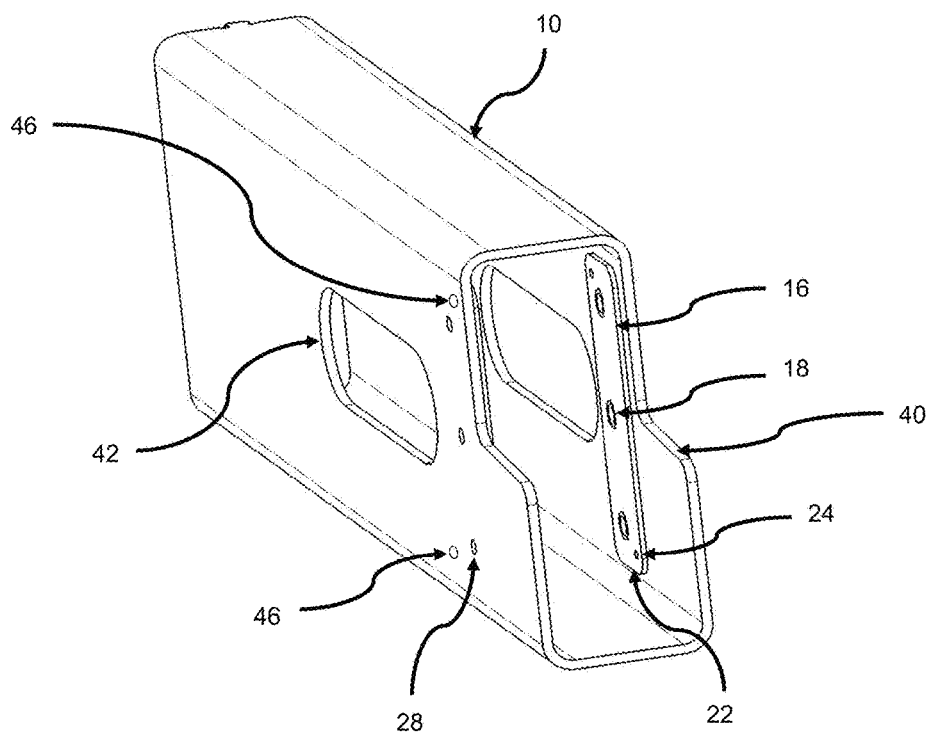
FIG. 4A is an isometric view showing an example of the components used in the retention and/or fastener side of a structural joint.
Figure 4B:
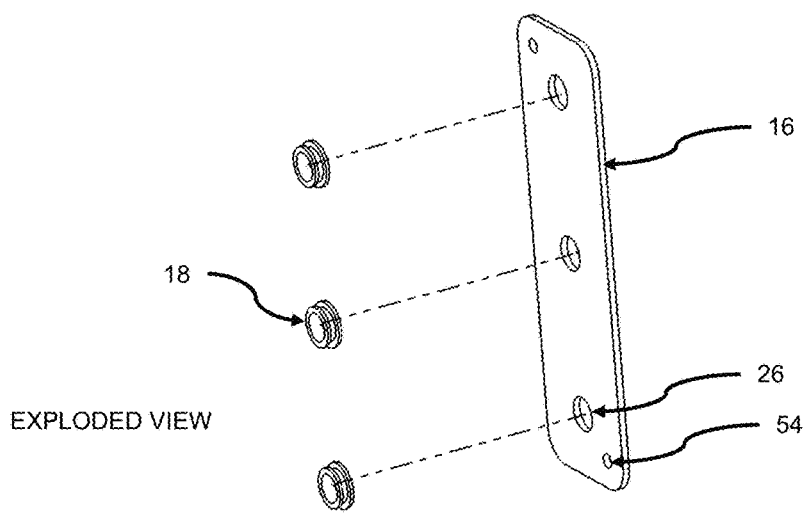
FIG. 4B is an isometric 'exploded' view showing a Nut-Plate assembly.

With reference to FIGS. 4A and 4B, the nut carrier plate (16) can have a removable fastener e.g. Riv-nut (18), a permanently fixed fastener (such as a welded nut) or a formed thread (such as a conventionally tapped or flow drilled hole) amongst others.

Nut carrier plates have the ability to be installed after finishing, for example, if the beam/member the nut carrier plate assembly (22) were being attached to required galvanizing or powder coating process that may damage or clog the threads.

Nut carrier plates and/or splice plates may be shimmed or otherwise adapted due to deformations in the attached members.

Riv-nuts (18) have the ability to be drilled out of the Nut carrier plates.

Joint can be spiced on only one wall.

Different sections can be mated and accommodated in splice(s) with the same or different sized fasteners.

The joint provisions such that it can be installed by one construction person with no special skills, training or inspection required.

Access hole or slot (42) can be used for nut attachment if carrier plate not used, the slot or hole can be used for utilities later.

A conventional nut can be installed using the access hole (42) or slots.

The parts can be adapted to utilize modern machining methods such as laser and water jet machined amongst others to produce close tolerance parts defined using 3D technology software.

Parts may be manufactured with additional locating and fastener holes incorporated in the part(s) or assembly(s) before delivery providing quick assembly on site, for example, the frame shown in structure [Green U.S. Pat. No. 8,186,110 B2] with or without the container required in the structure.

The fasteners can be installed while the person installing the fasteners remains in one location, they can be on either side or above/below the beam.

Drilling and threading can be completely omitted for the joints on the construction/assembly site unless required to replace damaged parts.

Joints can be assembled with conventional nut-bolt configuration, conventional bolt fastener or a blind fastener if required for repair purposes.

Locking mechanism(s) may be applied to the fastener installation such as washers or deformed threads for fasteners identified.

Members/joint can be installed by one person if sized accordingly.

Members may be held in place due to the forces of gravity.

The nut is captive installed in a replaceable carrier plate.

The joint can be dis-assembled.

The joint sub assembly can be mass produced using automated equipment, for example laser to water jet cutting, manual, semi-automated or automated methods (such as Robot welding) methods of fabrication.

The joint can be easily manufactured and reproduced using readily available technology and manufacturing equipment.

One embodiment incorporates a joint designed whereby only the fasteners (20) need to be installed on site to provide a structurally sound joint.

The design provides a solution for a tubular section joint where access to a nut or collar is not available.

The joint designed can be incorporated on metallic members, composite members or a combination of both metallic and composite members.

The retention method for the bolt can be formed threads produced by such means as with a tap or flow drilling (where the material is formed to allow for additional threads) or a nut/collar or a blind fastener.

Self-tapping screws omitting the need for the carrier plate and or full size holes to be present. In additional embodiments the threads can be either in the tube section or in a separate plate or nut carrier plate.

Joint can be made without clamping complete section.

Solid, Closed and Open sections can be attached to any combination of Solid, Closed and Open sections.

Open sections can also be accommodated in a similar manner to joining tube sections, including but not limited to, 'T','C', 'R', '1', 'U', 'Z' circular and any other conventional or non-conventional open profiled sections. Example of which are shown in FIG. 10 through FIG. 16.

Solid section can be accommodated by replacing the internal nut carrier plate with and external nut carrier plate or conventional nut configuration.

The joints may be grouped into a small number of standard joints with varying profiles, fasteners, splice plates, materials etc., then used to cover the joint combinations required for a complete structure.

Capable of accommodating different shaped members with different manufacturing tolerances.

Welding can be completed prior to assembly with only fasteners being installed during the erection for the structure, this allows frame structures to be transported to site, where the frame members are designed to accommodate packing, handling and transportation, the frame can be assembled quickly and easily on location. The assembly of the structural joint will now be discussed.

In some embodiments, the joint may consist of mating two profiled members together which are shaped where one of the members provides support in the vertical or normal direction (62) or both, for the other member. The joint consist of at least one splice plate preventing movement in the lateral direction (64), the joint being secured using fasteners (20) securing the joint and providing a means of load transfer. The fasteners are constrained by 'nuts' or 'Riv-nuts' to hold the fasteners in position.

The embodiments as shown in the FIGS. 1A through 16 typically uses nuts or 'Riv-nuts' attached to a nut carrier plate, the replaceable carrier plate is attached to the structural member in the example shown by flush (countersunk) head rivets, which additionally locates and holds the nuts in the correct location for fastening. With this example the fasteners would be installed from either side or one side if the connecting member where attaching as shown in FIG. 14. The structure can be assembled with the bolts installed in the manner described, this provides the option to install the fasteners finger tight then adjust the structure while the joints are loose, then tighten the correct position, allowing for some level of adjustment, the tightening process can be speeded up with the use of power tools such as battery powered nut runner or an air gun.

The threaded retainer can either be nuts attached to the plate or have threads directly formed in the part, tapped threads, flow drilling etc.

FIG. 1A shows a horizontal beam assembly with the structural joint at each end of the Span Beam/Member welded assembly (72), where Support Beam (10) would be secured in place for example being part of a welding frame assembly, this may be part of a Vertical corner beam (56), there would for example be two of these beams in place with Support Beam(s) (10) attached.

Figure 1B:
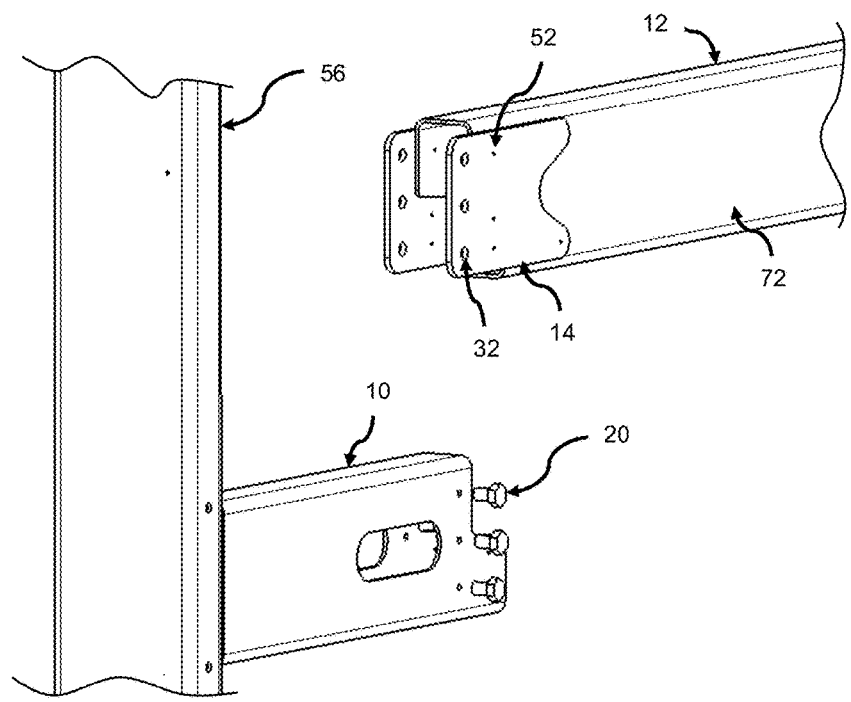

FIG. 1B presents details of a horizontal Beam/Member joint, the Span Beam/Member welded assembly (72) to be joined has splice plates (14) welded on the sides through which fasteners (20) secure the two members together.

Figure 2A:
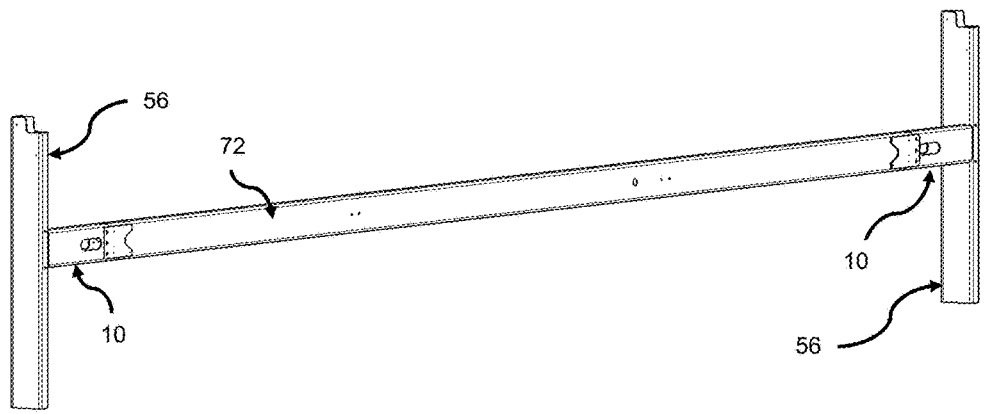
FIG. 2A and FIG. 2B show isometric views of the span beam in an installed position.
Figure 2B:
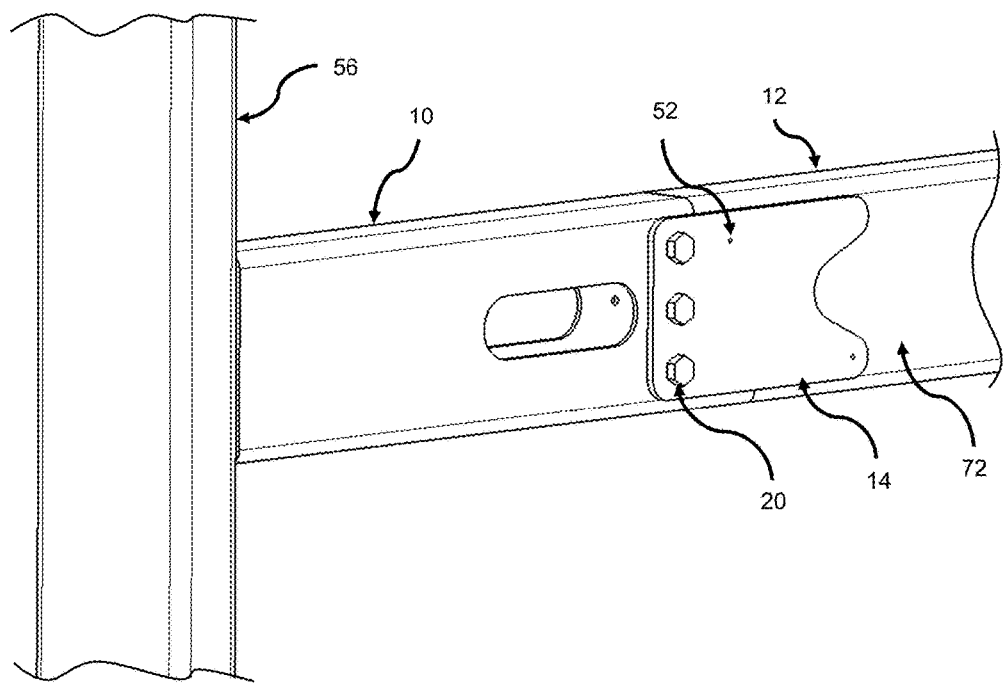

FIGS. 2A and 2B presents the 'installed' configuration of the joint assembly detailed in FIGS. 1A and 1B.

FIG. 3 shows an 'EXPLODED VIEW' of the joints presented in FIGS. 1B and 2B, attaching Span Beam/Member welded assembly (72) to Support Beam (10). The joint consists of a Support Beam (10) on either end of Span Beam/Member welded assembly (72), where the Support Beam (10) provides 'support' for the Span Beam/Member welded assembly (72) by means of contact between mating profile (40) and member profile (44). Span Beam/Member welded assembly (72) is made up of Span Beam (12) with Splice Plate(s) (14) welded using location holes (30) in the Span Beam (12) and holes (52) Splice Plate(s) (14) for alignment. Location holes (52) are common to both Splice Plates (14) and Span Beam (12) holes (30), where a 'roll' or 'spring' pin, or a dowel etc. is installed into both holes at the same time thereby aligning the location holes (30) and (52) in parts (12) and (14) respectively along centerline (36), provisioning the correct location for the fastener clearance holes (32) in Splice Plate (14) with respect to the fastener clearance holes (28) in Support Beam (10). The locating pin or dowel etc. can be left in place or removed. Splice Plates (14) would then be securely fastened in this configuration by means such as welding or another secure fastening means to Span Beam/Member (12). Span Beam/Member welded assembly (72) is held in position by contact between member profile (44) and Support Beam (10) mating profile (40) while residing in the horizontal position shown in FIGS. 2A, 2B and FIG. 3. With the beams (10) and (72) in the horizontal configuration the axial direction (60) is horizontal and the normal direction (62) is vertical, the supporting force(s) would be in the vertical direction (62) under the effects of gravity. If the beams were in-between horizontal (60) and vertical (62) the supporting force(s) would have components in both the horizontal (60) and vertical (62) directions.

Provisioning for the fastener (20) installation, there are fastener clearance holes (28) in Support Beam (10), common to the Splice Plate (14) fastener clearance holes (32) 'aligned' along centerline (34) at the assembly stage, FIG. 2B shows the assembled configuration. Support Beam (10) has Nut-carrier plate assemblies (22) attached with countersunk fasteners such as rivets, allowing the 'fastener head' to sit flush below the surface of Support Beam (10), thus allowing Splice Plates (14) to rest 'unobstructed' against sides of Support Beam (10). Nut-carrier plate assembly (22) consist of 'Riv-Nuts' (18) installed in Nut Carrier Plate (16). When the fastener clearance holes (28) and (32) are aligned, fasteners (20) are threaded into the 'Riv-Nuts' (18) which are part of the Nut-carrier plate assembly (22). Washers (48) can be installed under the fastener heads as shown in FIG. 5B. It should be noted the location either side of the tube section shown are not required to be aligned as show on centerline (34), the fasteners (20) can be in a configuration to suit any geometric and/or loading requirements and the number of fasteners (20) can vary. The fasteners (20) in the same or different joints can differ in type and size.

Movement is restricted with the joint in the 'located' position where Span Beam/Member welded assembly (72) is held in position by contact between member profile (44) and Support Beam (10) mating profile (40) in the horizontal position shown. Prior to the fasteners being installed, movement is prevented in the vertical (downward) direction (62) and axial direction (60) by contact between profiles (40) and (44), the lateral direction (64) and rotational directions (66) and (68) by means of contact between Splice Plates (14) and Beam Support Beam (10).The joint is free to move in the vertical (upwards) direction (62) and rotation (70) prior to any fasteners (20) being installed, however when at least one fastener is installed this movement is then restricted, in the vertical (upwards) direction (62) by fastener (20) and in rotation (70) by a combination of reaction forces between fastener (20) in holes (28) and (32) and at the contact point of mating profiles (40) and (44).

FIG. 4A show the details of the Nut-carrier plate assembly (22) attachment to Support Beam (10). The fastener clearance holes (28) are aligned with the Riv-Nut (18) by means of countersunk fastener holes (46) being aligned with the attachment fastener holes (54) in Nut carrier plate (16). The fasteners (24) with countersunk heads, are installed with the head in the Support Beam (10) and into the Nut-carrier plate assembly (22) to connect the two components together, the fastener can be such as a rivet, nut/bolt or and another suitable configuration.

FIG. 4B shows an exploded view of a Nut-carrier plate assembly (22) consisting of a Nut-carrier plate (16) and 'Riv-nuts' (18) formed to attach to the Nut-Carrier Plate (16) through holes (26). This could be replaced by other configurations such as the nut being welded/bonded to the carrier plate or other suitable means. Fastener holes (54) are used to both locate and attach the Nut-carrier plate assembly (22) to Support Beam (10).

Figure 5A:
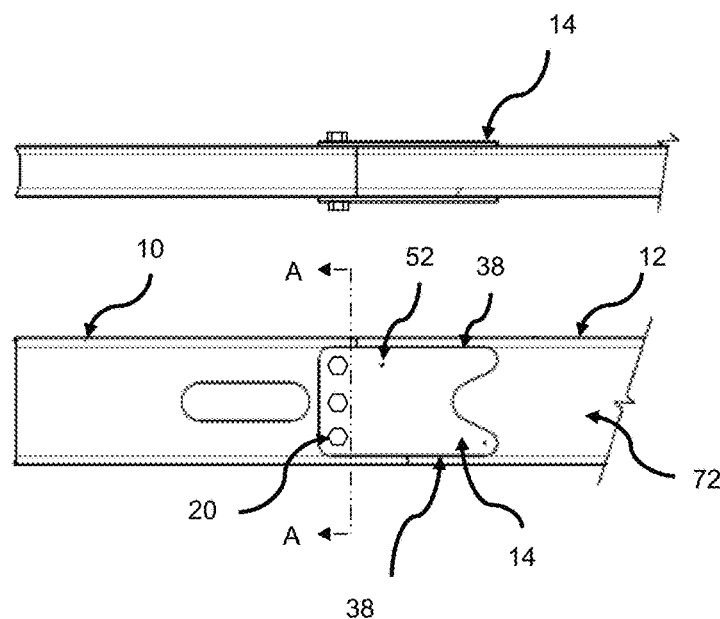
FIG. 5A and FIG. 5B are 'side', 'plan', 'end' and 'sectional' views of a structural joint.
Figure 5B:
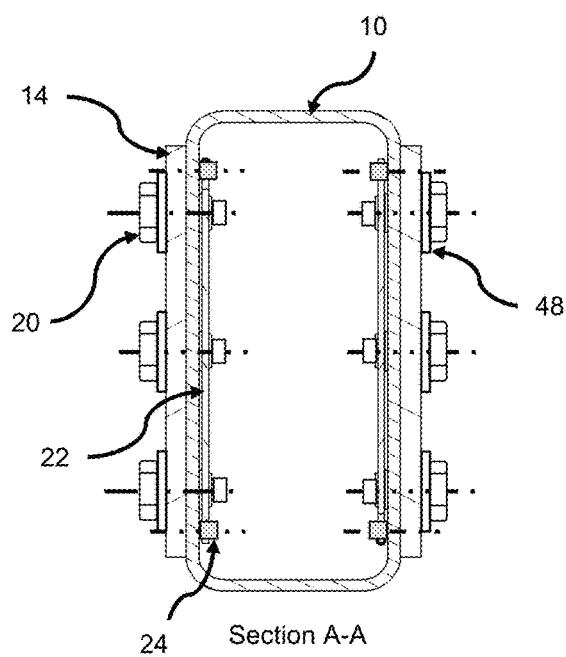

FIGS. 5A and 5B show Support Beam (10) and Span Beam/Member welded assembly (72) in the fastened configuration. FIG. 5A shows a side and plan view of the assembled joint with fasteners (20) installed, washers (48) are installed under fastener (20) heads. Splice plates (14) are shown welded (38) to the Support Beam (10) in this embodiment. FIG. 5B presents a sectional view showing the fasteners (20) installed in Nutcarrier plate assemblies (22). The Nut-carrier plate assemblies (22) are attached to Support Beam (10) with countersunk fasteners (24), as detailed in FIGS. 4A and 4B. Washers (48) are shown installed under fastener (20) heads. The washers (48) can be in the form of a locking device for the fasteners (20).

Figure 6:
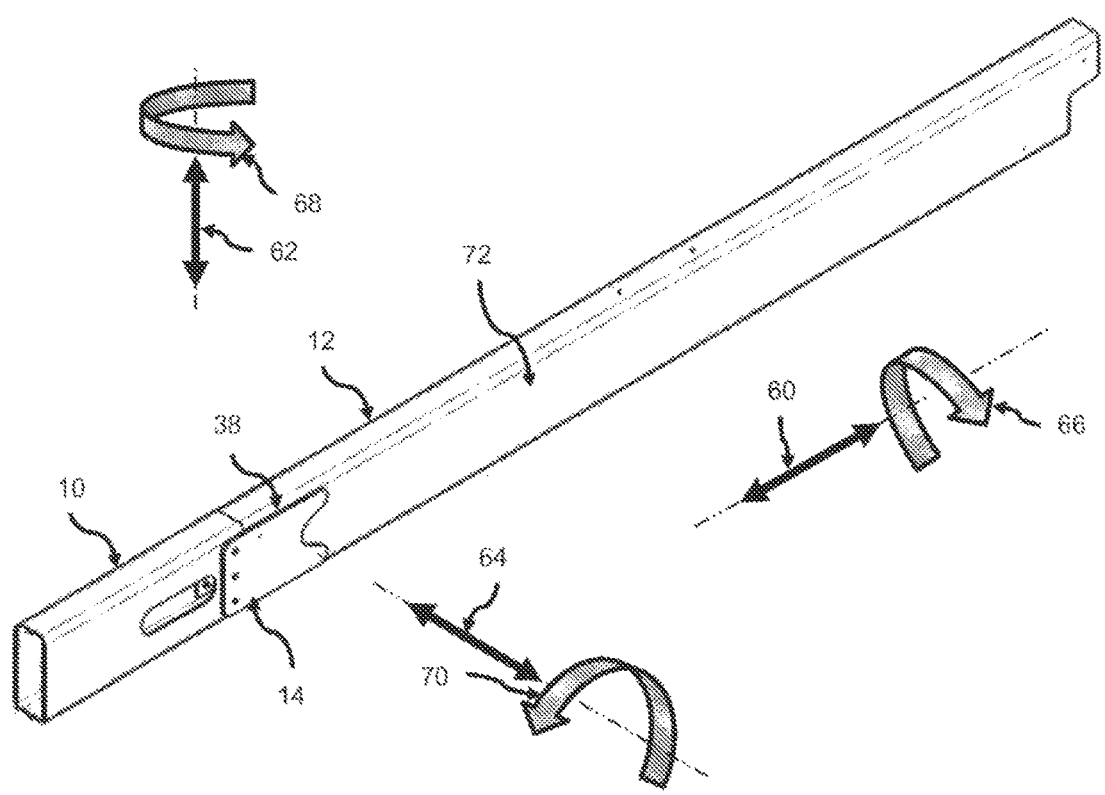
FIG. 6 is an isometric view showing an assembled view of a structural joint.
Figure 7:
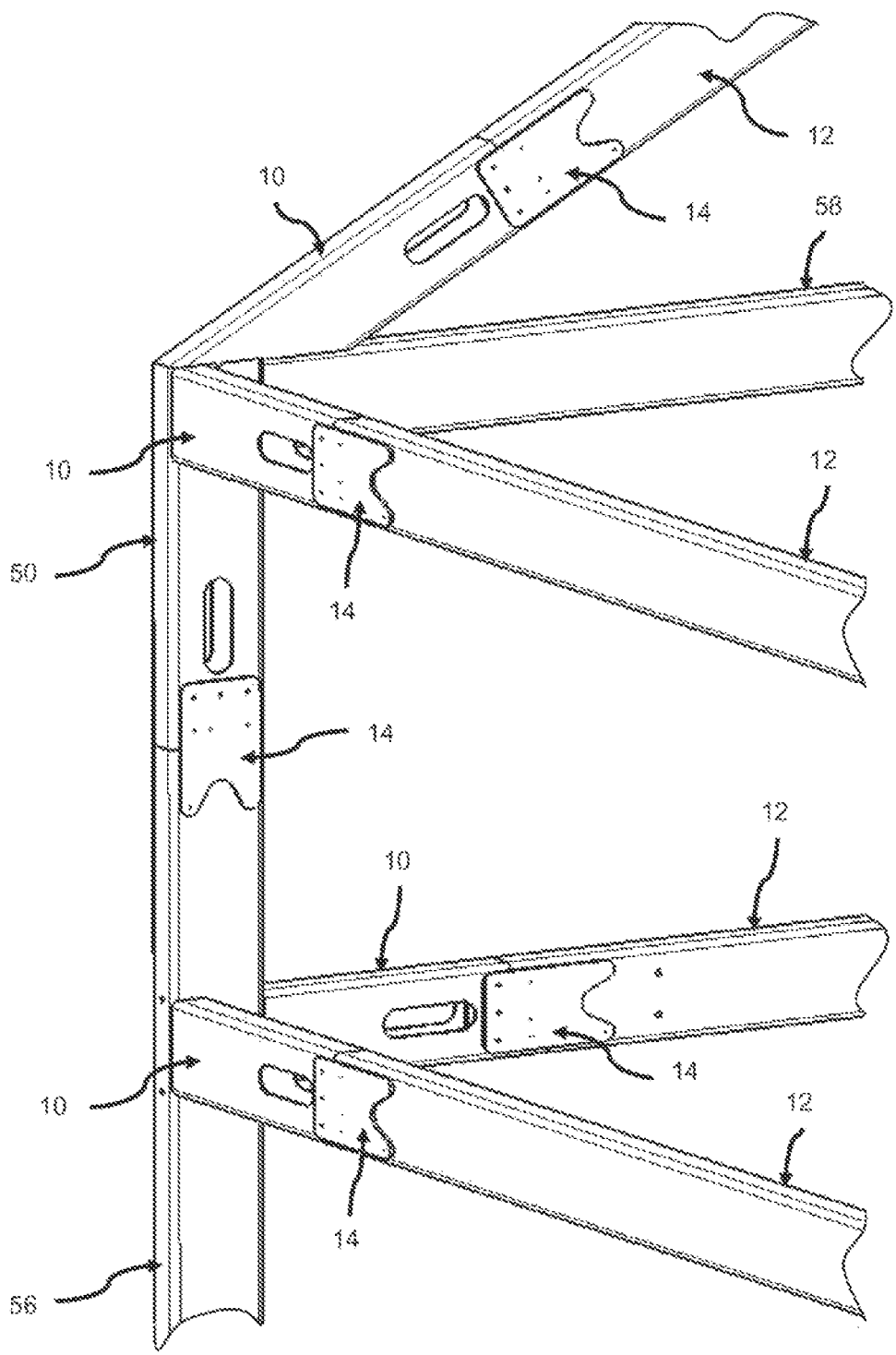
FIG. 7 is a view of a tubular structure frame with joints for vertical, horizontal and sloped members.

FIG. 6 shows Support Beam (10) and Span Beam/Member welded assembly (72) in the fastened configuration.

FIG. 7 shows example of the joints being used to create a tubular structure. The configuration includes Span Beams (12), vertical support column (56) and lateral roof support beam (58). Support Beams (10) provide support for Span Beams (12) where both beams can be horizontal, vertical or any angle in-between and have mating profiles to accommodate any design and loading requirements. Support Beam (50) and Column member (56) are further described in FIG. 8, providing an example of mating profile (40) and member profile (44) being modified to suit the orientation of the joint.

Figure 8:
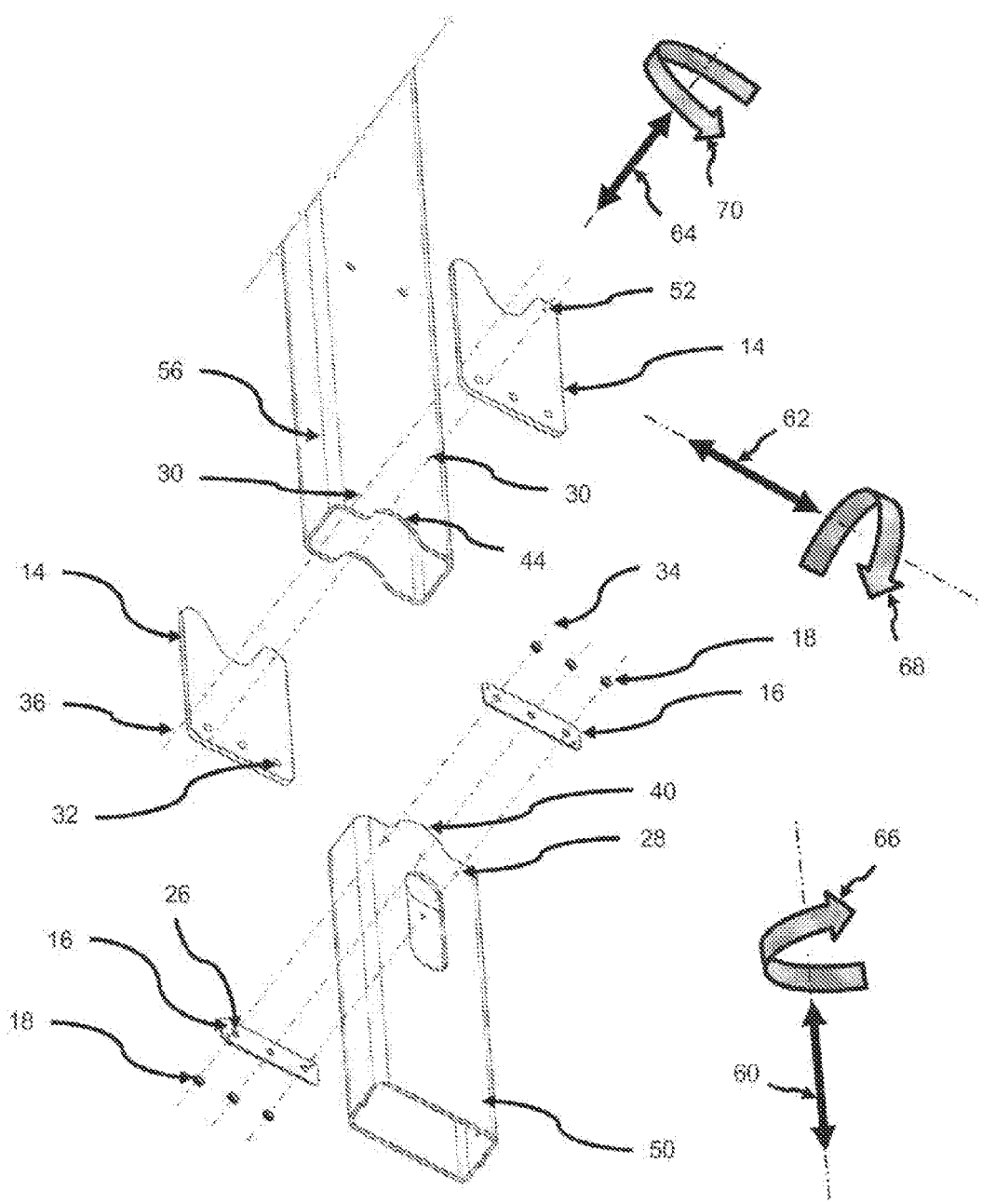
FIG. 8 is an isometric view showing an exploded view of an alternative profile for the structural joint that may be used in the vertical orientation.

FIG. 8 shows a joint where the mating profile is suited for a vertical joint, note the figure represents the Support Beam (50) and Column member (56) in different positions in comparison with FIG. 7, showing the joint is suitable for either orientation. Support Beam (50) has a mating profile (40) to accept the Column member (56) with member profile (44). The joint description is similar to that of the description for FIG. 3, with the exception of the joint orientation, for example vertical direction now being (60) in lieu of (62) as shown in FIG. 3. The respective directions can be seen by comparing the orientations shown in FIG. 3 and FIG. 8.

Figure 9:
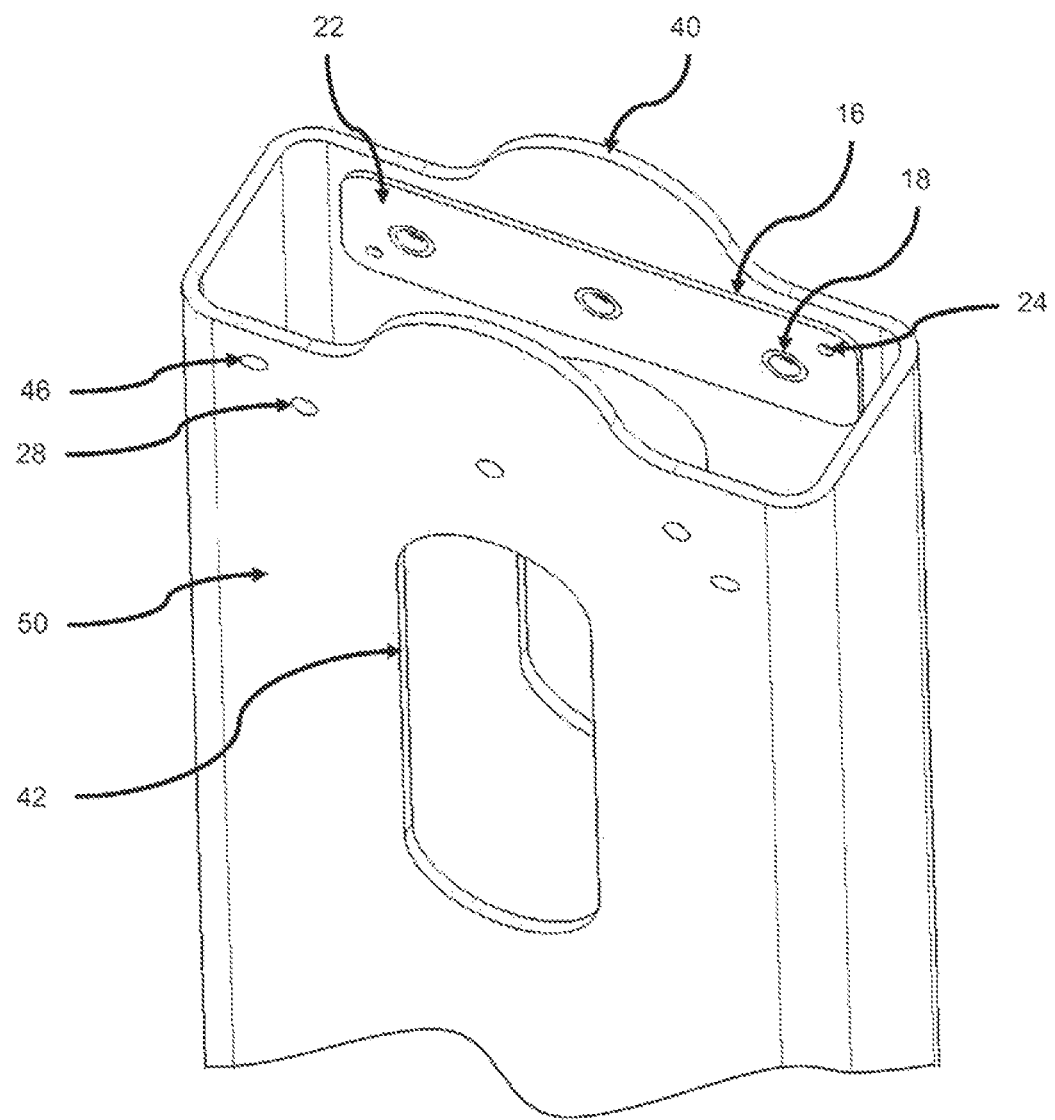
FIG. 9 is an isometric view showing an example of the components used in the retention/fastener side of the structural joint shown in FIG. 8.

FIG. 9 shows the Nut-carrier plate assembly (22) attached to Support Beam (50), the description of the attachment is similar to that provided for FIGS. 4A and 4B, the difference being the orientation of the joint.

Figure 10:
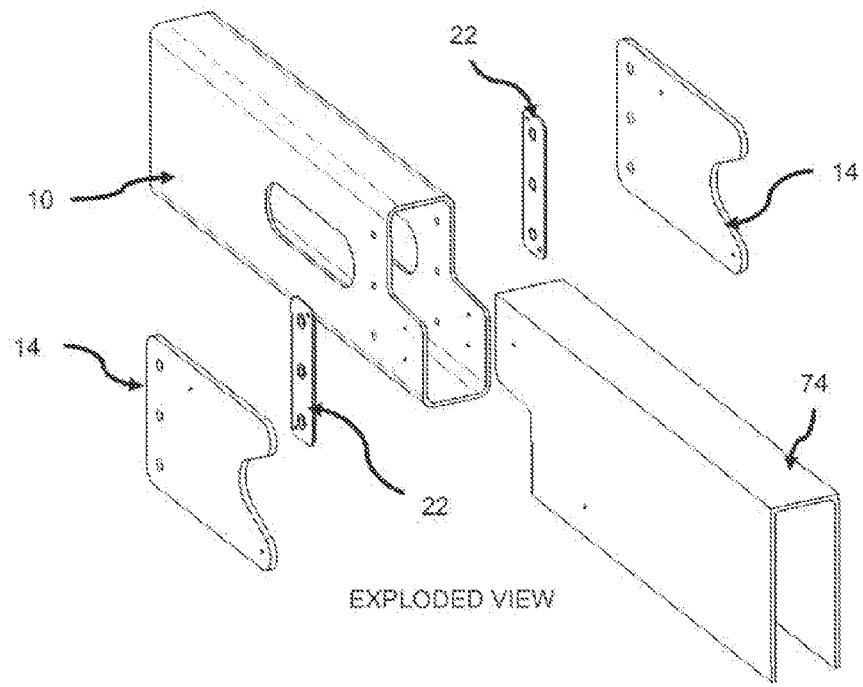
FIG. 10 is a view of 'rectangular' and 'C' shaped members being joined.

FIG. 10 shows the attachment of a rectangular section to a 'C' section where in comparison with FIG. 3, Span Beam (12) has been replaced with Span Beam (74) 'C' section, the assembly of the joint will be similar to that described for FIG. 3.

Figure 11:
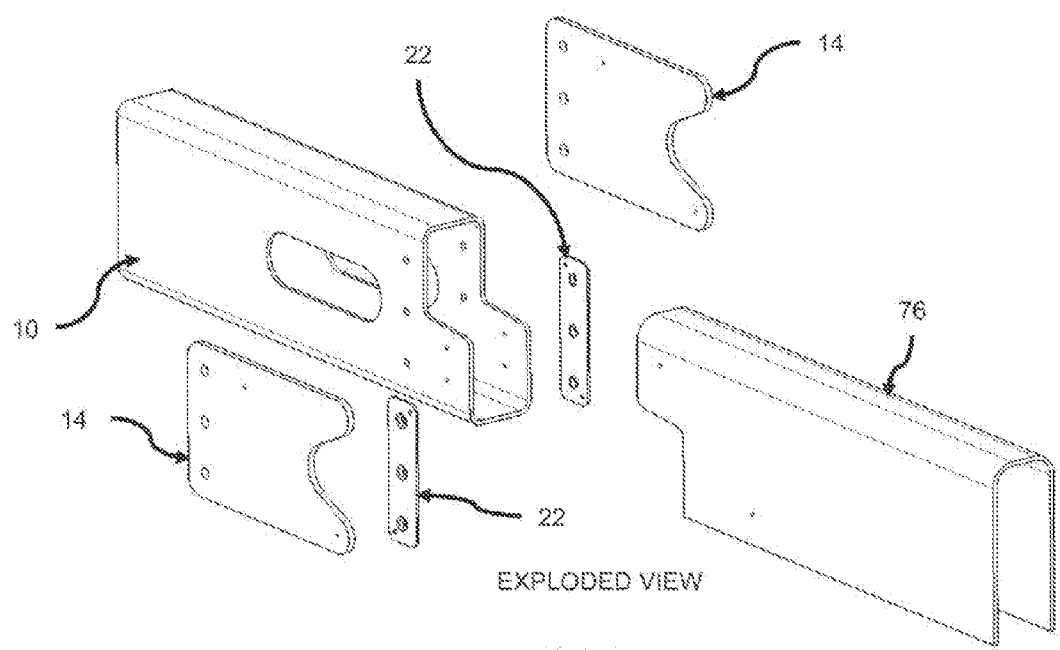
FIG. 11 is a view of 'rectangular' and 'U' shaped members being joined.

FIG. 11 shows the attachment of a rectangular section to a 'U' section where in comparison with FIG. 3, Span Beam (12) has been replaced with Span Beam (76) 'U' section, the assembly of the joint will be similar to that described for FIG. 3.

Figure 12:
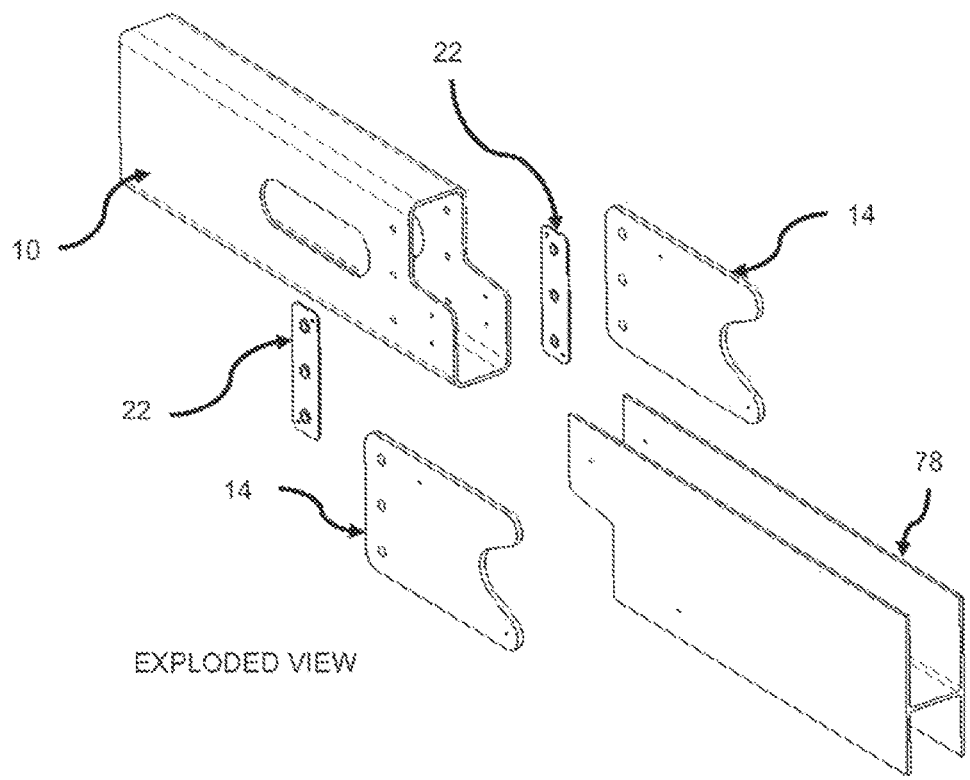
FIG. 12 is a view of 'rectangular' and 'H' shaped members being joined.

FIG. 12 shows the attachment of a rectangular section to a 'H' section where in comparison with FIG. 3, Span Beam

(12) has been replaced with Span Beam (78) 'H' section, the assembly of the joint will be similar to that described for FIG. 3.

Figure 13:
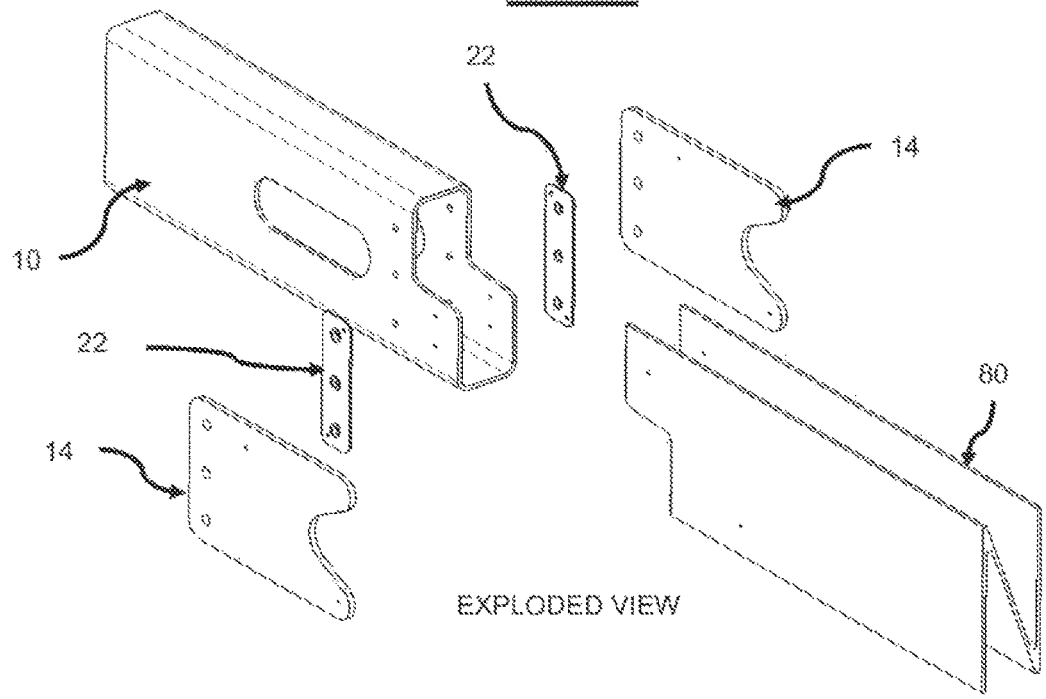
FIG. 13 is a view of 'rectangular' and 'Z' shaped members being joined.
Figure 14:
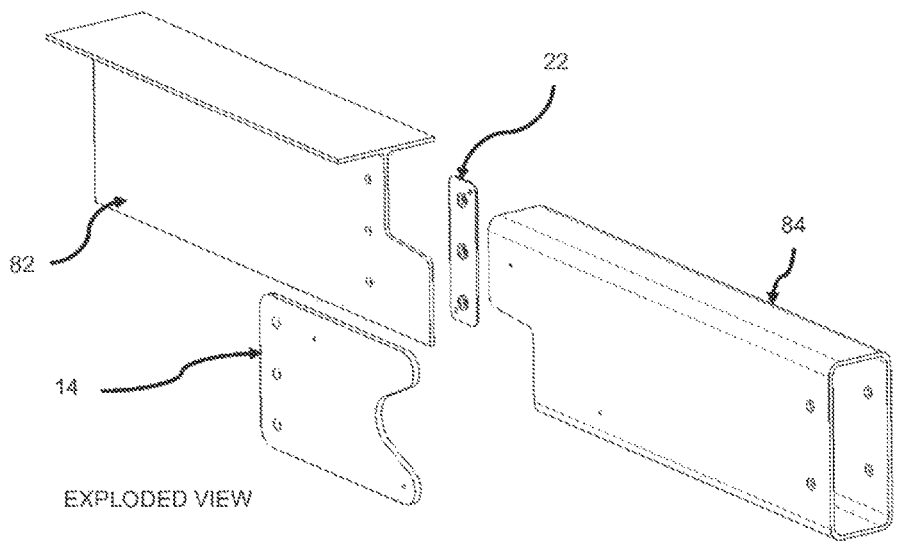
FIG. 14 is a view of 'rectangular' and T shaped members being joined.

FIG. 13 shows the attachment of a rectangular section to a 'Z' section where in comparison with FIG. 3, Span Beam (12) has been replaced with Span Beam (80) 'Z' section, the assembly of the joint will be similar to that described for FIG. 3.

FIG. 14 shows a T section being attached to one of the sidewalls of a rectangular tube section. In comparison with FIG. 3, Support Beam (10) has been replaced with a T section Support Beam (82) and Span Beam (12) has been replaced with Span Beam (84) where location holes common to Splice Plate (14) may only be required on one side. The attachment is similar manner to that described in FIG. 3 where Splice Plate (14) is attached to one side only.

FIG. 15 shows the attachment of dissimilar sized members. In comparison with FIG. 3, Span Beam (12) has been replaced with Span Beam (86) and Splice Plate (14) has been replaced with Splice Plate (88). Span Beam (86) is of a different cross section to Support Beam (10), therefore Splice Plate (88) is profiled to accommodate the difference in sections between Support Beam (10) and Span Beam (86). If the sections were of different widths, this would be accommodated by Splice Plate (88) being formed accordingly to match the change in section. Other than the difference in section profiles, the assembly of the joint will be similar to that described for FIG. 3. The item reference numbers have been changed to reflect the profile changes.

Figure 16:
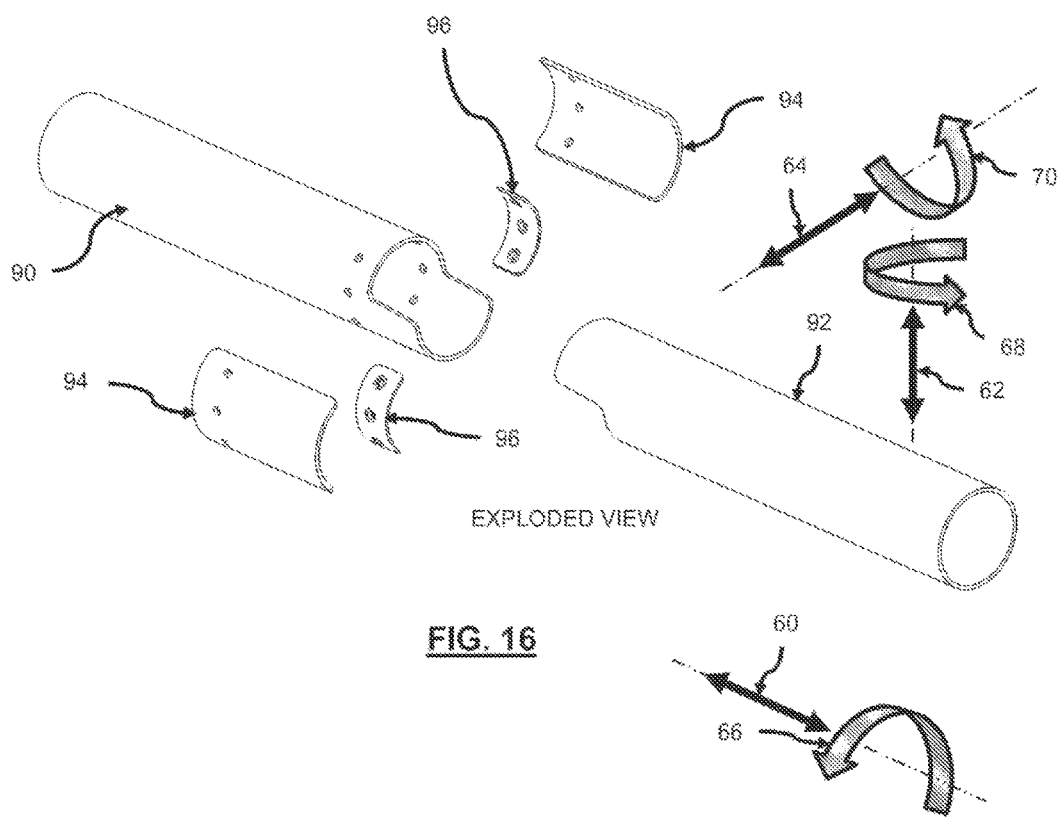
FIG. 16 is a view of a structural joint between two circular cross-sectional members.

FIG. 16 shows the definition of the joint using circular sections, the joint being similar to that described for FIG. 3. Summarizing the differences; Support Beam (10) has been replaced with Support Beam (90), Span Beam (12) has been replaced with Span Beam (92), Splice Plate (14) has been replaced with Splice Plate (94) and Nut-carrier plate assemblies (22) have been replaced with Nut-carrier plate assemblies (96). Other than the difference in section profiles, the assembly of the joint will be similar to that described for FIG. 3. The item reference numbers have been changed to reflect the profile changes.

Figure 17:
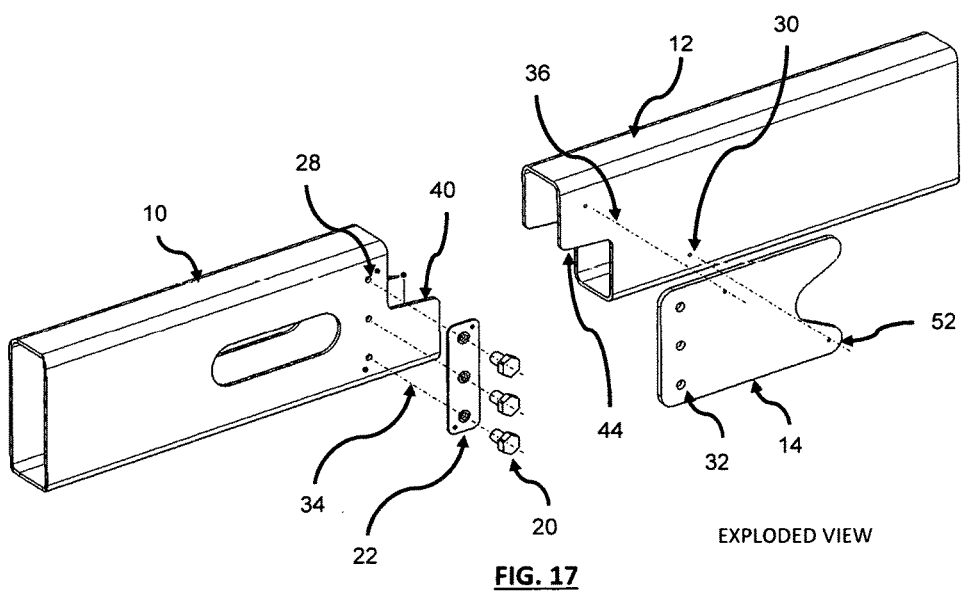
FIG. 17 is an isometric view showing an exploded view of a structural joint for mating members using a single splice plate attached to one side.

FIG. 17 shows an 'EXPLODED VIEW' of a structural join with a single splice plate attached to one side only. The joint primarily consist of two Structural Members (10) and (12) to be adjoined and a single Splice Plate (14), with the Fasteners (20) and fastener retention provisions, Nut Carrier Plate assembly (22). The Nut Carrier Plate assembly (22) is attached to the inner surface of the tube section, the Nut Carrier Plate assembly (22) has been shown external for description purposes. The configuration is similar to that described in FIGS. 3, 4A, 4B, 5A and 5B, with the a single splice plate attached to one side, as opposed to two splice plates attached to two sides.

Thus, in some embodiments, the structural joints described herein may include some or all of the following features.

A first structural member having a first mating face at one end of the first structural member, the first mating face having a two dimensional profile, a second structural member having a second mating face at one end of the second structural member and positioned proximate to the first mating face of the first structural member, the second mating face having a two dimensional profile that is similar to the two dimensional profile of the first mating face, a splice plate or carrier plate secured to the first structural member at the first mating face and removably secured to the second structural member at the second mating face, and fasteners that secure the splice plate to the first structural member and removably attach the splice plate to the second structural member, the second member may also have a removably attached nut carrier plate provisioning fastener retention.

The two dimensional profile of the first mating face complements the two dimensional profile of the second mating face such that the first mating face applies a force to the second mating face in a first orthogonal direction to a long axis of the first structural member and the second structural member and the second mating face applies a force to the first mating face in a second orthogonal direction that is opposite to the first orthogonal direction when the first mating face adjoins the second mating face;

The two dimensional profile of the first mating face complements the two dimensional profile of the second mating face such that the first mating face applies a force to the second mating face in a first generally perpendicular direction to a long axis of the first structural member and the second structural member and the second mating face applies a force to the first mating face in a second generally perpendicular direction that is opposite to the first generally perpendicular direction when the first mating face adjoins the second mating face;

The two dimensional profile of the first mating face complements the two dimensional profile of the second mating face such that the first mating face applies multiple forces to the second mating face in two or more different first directions to a long axis of the first structural member and the second structural member and the second mating face applies multiple forces to the first mating face in two or more different second directions that are opposite to the two or more different first directions when the first mating face adjoins the second mating face;

The splice plate is secured to an internal space of the first structural member within the first mating face and is removably secured to an internal space of the second structural member within the second mating face;

The splice plate is secured to an external face of the first structural member at the first mating face and is removably secured to an external face of the second structural member at the second mating face;

The splice plate is secured to an internal space of the first structural member within the first mating face and is removably secured to an internal space of the second structural member within the second mating face, and a second splice plate is secured to the internal space of the first structural member within the first mating face and removably secured to the internal space of the second structural member within the second mating face;

The splice plate is secured to an external face of the first structural member at the first mating face and is removably secured to an external face of the second structural member at the second mating face, and a second splice plate is secured to another external face of the first structural member at the first mating face and removably secured to another external face of the second structural member at the second mating face;

The two dimensional profile of the first mating face includes a protrusion at a top portion of the first mating face of the first structural member and wherein the two dimensional profile of the second mating face includes a protrusion at a bottom portion of the second mating face of the second structural member, As described herein, either members can protrude at the top or the bottom or at the sides;

The two dimensional profile of the first mating face complements the two dimensional profile of the second mating face;

A portion of the two dimensional profile of the second mating face rests on a portion of the first mating face of the first structural member when the second structural member is positioned proximate to the first structural member, The structural joint includes at least two structural members connected by load bearing fasteners; the structural members being attached via splice plate(s) securely attached to one of the joining members through which attachment fastener(s) engage, securely attaching it to a joining member to form a load bearing joint, the attachment fastener(s) and a detachable plates(s) with replaceable nut(s) securely attached where both the adjoining structural member mating faces are profiled such that the profile and the splice plates provide support for the structural members in the direction to overcome the effects of gravity, and/or any design or loading requirements, and/or supporting safe assembly;

There is no welding required to secure the joint at the site of assembly, note—if there were a specific requirement for welding the joint could be welded as configured;

The nut carrier plate provisions one sided installation and is remove-ably attached to allow replacement;

Attachment can be via the upper, lower or side faces, in any combination providing installation, of the structural members being joined;

The structural members include one or more of: generally straight beam members, curved beam members, vertical beam attachments, horizontal beam attachments, sloped beam attachments, twisted attachments, floor beam attachments, roof beam attachments, window supports, door supports;

The attachment fasteners are lockable to resist rotation due to vibration or loosening effects;

Releasable self—supporting load bearing joint where mating structural members are profiled to aid location and to utilize the effect of gravity to hold the adjoining members together where the use of gravity to stabilize and hold in position before and while fasteners are being installed
One sided installation;

The fasteners can be removed to aid disassembly of the structure;

Designed for mass production using readily available production methods and machinery;

The fasteners and carrier plates are replaceable.

Some or all components of the structural joint is repairable or lockable;

Different shaped/profiled members can be mated, such as square to rectangle, square to circle, square to I Beam, and the splice plates are shaped to conform to the various shaped members;

Splice plate on at least one wall/face, can be welded on both sides of a member or one splice plate per member;

Profiled to match loading direction (e.g., gravity) where the mating face provide a datum for the joint location and allows installation of fasteners;

Allows frame structure to be transported to site, where the frame members are designed to accommodate packing, handling and transportation, the frame can be assembled quickly and easily on location;

Both the profile and the splice plates provide support for the structural members in the vertical and axial direction relative to the orientation of the structural members and/or in the direction gravity is acting while the retention/securing fasteners are being installed;

Both the profile and the splice plates provide support for the structural members in the vertical, axial, transverse direction relative to the orientation of the structural members and/or in the direction gravity is acting while the retention/securing fasteners are being installed;

Mating members are at an angle of +/−180 Deg. To the axial plane of the members forming the joint;

The splice joint can be used to secure the mating structural members in place prior to seam welding if welding were required; and so on.

Although aspects of the present technology have been described with respect to specific examples, embodiments of the present technology are not limited by these examples. For example, persons of skill in the art will recognize that joints between other structural members not specifically described herein may utilize the technology described herein without departing from the scope or spirit of the present technology.

The invention claimed is:

1. A structural joint system comprising:
   a first structural member having
      a length in an axial direction,
      a height in a direction transverse to the axial direction,
      a width in a direction transverse to the axial direction and normal to the height,
      a hollow cross sectional profile and;
      a first mating section at one end of the length, the first mating section having a first axial protrusion, forming an intermediate surface along the entire edge of the structural member, comprising several surfaces,
      a first surface extending in the height direction,
      a second surface extending from the first surface,
      a third surface extending from the second surface and extending in the height direction,
      wherein each adjoining surface incorporates a radius with an axis of rotation about the width axis, and extending in an axial direction;
   a second structural member having
      a length in an axial direction,
      a height in a direction transverse to the axial direction,
      a width in a direction transverse to the axial direction and normal to the height,
      a hollow cross sectional profile and
      a second mating section at one end of the length, the second mating section having a second axial protrusion,
      wherein the second mating section compliments the first mating section;
      wherein the second member includes one or more holes in a first side of the member, configured for alignment to accommodate at least one fastener;
   a first splice plate secured to a first side of the first structural member proximate the first mating section and configured for removable attachment to a first side of the second structural member proximate the second mating section;
      wherein the first splice plate includes one or more holes configured for alignment to accommodate one or more fasteners,
   a first fastener retainer attached to a first side of the second structural member and configured to receive one or more fasteners to secure the first splice plate to the second member;
   a first fastener or plurality of fasteners configured to removably attach the first splice plate to the second structural member;
   wherein the first and second structural members have the same geometric shape and have a different height.

2. The structural joint of claim 1, wherein the first and second structural members have a different width.

3. The structural joint of claim 1, further comprising a first access hole on a first side of the second structural member, proximate the fastener or plurality of fastener hole(s).

4. The structural joint system of claim 1, wherein the second member includes one or more holes in a second side of the member, configured for alignment to accommodate at least one fastener, further comprising:
   a second splice plate secured to a second side of the first structural member proximate the first mating section and configured for removable attachment to a second side of the second structural member proximate the second mating section;
      wherein the second splice plate includes one or more holes configured for alignment to accommodate one or more fasteners,
   a second fastener retainer attached to a second side of the second structural member and configured to receive one or more fasteners to secure the second splice plate to the second member;
   a second fastener or plurality of fasteners configured to removably attach the second splice plate to the second structural member.

5. The structural joint of claim 4, wherein the first and second structural members have the same geometric shape and have a different thickness.

6. The structural joint of claim 4, wherein the first and second structural members have a different width.

7. The structural joint of claim 4, further comprising;
   a first access hole on a first side of the second structural member, proximate the fastener or plurality of fastener hole(s),
   a second access hole on a second side of the second structural member, proximate the fastener or plurality of fastener hole(s).

8. A structural joint system comprising:
   a first structural member having
      a length in an axial direction,
      a height in a direction transverse to the axial direction,
      a width in a direction transverse to the axial direction and normal to the height,
      a hollow cross sectional profile and;
      a first mating section at one end of the length, the first mating section having a first axial protrusion, forming an intermediate surface along the entire edge of the structural member, comprising several adjoining surfaces,
      a first surface extending in the height direction,
      a second surface extending from the first surface,
      a third surface extending from the second surface and extending in the height direction,
      wherein each adjoining surface incorporates a radius with an axis of rotation about the width axis, and extending in an axial direction,
      where one or more locating holes are provided in a first side of the first structural member to locate and align a first splice plate,
   a second structural member having
      a length in an axial direction,
      a height in a direction transverse to the axial direction,
      a width in a direction transverse to the axial direction and normal to the height,
      a hollow cross sectional profile and
      a second mating section at one end of the length, the second mating section having a second axial protrusion,
      wherein the second mating section compliments the first mating section;
      wherein the second member includes one or more holes in a first side of the member, configured for alignment to accommodate at least one fastener;
   a first splice plate secured to a first side of the first structural member proximate the first mating section and configured for removable attachment to a first side of the second structural member proximate the second mating section;
      wherein the first splice plate includes one or more locating holes configured for location and alignment to a first side of the first structural member;
      wherein the first splice plate includes one or more holes to accommodate one or more fasteners to secure the first splice olate to the second member;
   a first fastener retainer consisting of a nut carrier plate and a captive nut, removably attached to an internal face of a first side of the second structural member, using flush fasteners in the wall of the first side of the second structural member, and configured to receive one or more fasteners to secure the first splice plate to the second member;
   a first fastener or plurality of fasteners configured to removably attach the first splice plate to the second structural member;
   wherein the first and second structural members have the same geometric shape.

9. The structural joint of claim 8, further comprising a first access hole on a first side of the second structural member, proximate the fastener or plurality of fastener hole(s).

10. The structural joint of claim 9, further comprising a second access hole on a second side of the second structural member, proximate the fastener or plurality of fastener hole(s).

11. A method of forming a structural joint, the method comprising:
   providing a first structural member having,
      a length in an axial direction,
      a height in a direction transverse to the axial direction,
      a width in a direction transverse to the axial direction and normal to the height,
      a hollow cross sectional profile and;
      a first mating section at one end of the length, the first mating section having a first axial protrusion, forming an intermediate surface along the entire edge of the structural member, comprising several adjoining surfaces,
      a first surface extending in the height direction,
      a second surface extending from the first surface,
      a third surface extending from the second surface and extending in the height direction,
      wherein each adjoining surface incorporates a radius with an axis of rotation about the width axis, and extending in an axial direction;
      where one or more locating holes are provided in a first side of the first structural member to locate and align a first splice plate,
   a second structural member having
      a length in an axial direction,
      a height in a direction transverse to the axial direction,
      a width in a direction transverse to the axial direction and normal to the height,
      a hollow cross sectional profile and
      a second mating section at one end of the length, the second mating section having a second axial protrusion,
      wherein the second mating section compliments the first mating section;

wherein the second member includes one or more holes in a first side of the member, configured for alignment to accommodate at least one fastener;

a first splice plate welded to a first side of the first structural member proximate the first mating section and configured for removable attachment to a first side of the second structural member proximate the second mating section;

wherein the first splice plate includes one or more locating holes configured for location and alignment to a first side of the first structural member;

wherein the first splice plate includes one or more holes to accommodate one or more fasteners to secure the first splice plate to the second member;

a first fastener retainer consisting of a nut carrier plate and a captive nut, removably attached to an internal face of a first side of the second structural member, using flush fasteners in the wall of the first side of the second structural member, and configured to receive one or more fasteners to secure the first splice plate to the second member;

a first fastener or plurality of fasteners configured to removably attach the first splice plate to the second structural member;

wherein the first and second structural members have the same geometric shape.

12. The method of claim 11, wherein the first structural member is removably attached to the second structural member by bolting the first splice plate to the second structural member.

* * * * *